(12) United States Patent
Kishida et al.

(10) Patent No.: US 12,546,632 B2
(45) Date of Patent: Feb. 10, 2026

(54) DISTRIBUTED POSITION DETECTION ROPE AND DISTRIBUTED POSITION DETECTION SYSTEM

(71) Applicants: NEUBREX CO., LTD., Kobe (JP); NISHI NIPPON ELECTRIC WIRE & CABLE CO., LTD., Oita (JP)

(72) Inventors: Kinzo Kishida, Kobe (JP); Yoshiaki Yamauchi, Kobe (JP); Junichi Kawabata, Tokyo (JP); Shoji Seno, Tokyo (JP); Hideki Nagatani, Tokyo (JP); Michio Imai, Tokyo (JP); Yukihiro Hamada, Oita (JP); Kazumitu Watanabe, Oita (JP)

(73) Assignee: NEUBREX CO., LTD., Kobe (JP)

( * ) Notice: Subject to any disclaimer, the term of this patent is extended or adjusted under 35 U.S.C. 154(b) by 420 days.

(21) Appl. No.: 18/044,165

(22) PCT Filed: Oct. 15, 2020

(86) PCT No.: PCT/JP2020/038936
§ 371 (c)(1),
(2) Date: Mar. 6, 2023

(87) PCT Pub. No.: WO2022/079855
PCT Pub. Date: Apr. 21, 2022

(65) Prior Publication Data
US 2023/0332931 A1    Oct. 19, 2023

(51) Int. Cl.
*G01D 5/353* (2006.01)
(52) U.S. Cl.
CPC .................... *G01D 5/353* (2013.01)
(58) Field of Classification Search
CPC .... G02B 6/443; G02B 6/4432; G02B 6/4415; G02B 6/4427; G01D 5/353;
(Continued)

(56) References Cited

U.S. PATENT DOCUMENTS 8,826,973 B2 *   9/2014   Moxley ................. E21B 21/103
                                                      166/384
10,173,381 B2 *  1/2019   Xia ........................ B29C 48/154
(Continued)

FOREIGN PATENT DOCUMENTS

BR    PI0511469 B1 * 12/2016    ........... E21B 47/135
CA        1322580 C  *  9/1993    ............. H04H 20/69
(Continued)

OTHER PUBLICATIONS

BR_PI0511469_B1 (English translation) (Year: 2016).*
(Continued)

*Primary Examiner* — Thomas A Hollweg
*Assistant Examiner* — Mary A El-Shammaa
(74) *Attorney, Agent, or Firm* — BUCHANAN, INGERSOLL & ROONEY PC

(57) ABSTRACT

A distributed position detection rope includes: basic optical elements each including an optical fiber, tensile strength bodies, and a sheath material and the tensile strength bodies; a cylindrical inner sheath layer having a first optical element formed by arranging a plurality of the basic optical elements which are arranged at positions on the same circle and are helically wound at a predetermined pitch along the axial direction of the axis; and a cylindrical outer sheath layer on the outer side of the inner sheath layer and having a second optical element which are arranged at positions on the same circle and are helically wound along the axial direction so as to have a placement angle different from that of the basic optical elements of the first optical element.

19 Claims, 7 Drawing Sheets

(58) Field of Classification Search
CPC .......... G01D 5/35338; G01D 5/35345; G01D 5/35348; G01D 5/35341; G01D 5/35351; G01D 5/35354; G01D 5/3537

See application file for complete search history.

(56) References Cited

U.S. PATENT DOCUMENTS

| | | | |
|---|---|---|---|
| 11,555,939 B2 * | 1/2023 | Wilson | G01V 1/48 |
| 11,714,245 B2 * | 8/2023 | Martin Regalado | G02B 6/4435 385/12 |
| 2008/0212082 A1 | 9/2008 | Froggatt et al. | |
| 2011/0109898 A1 | 5/2011 | Froggatt et al. | |
| 2013/0094798 A1 * | 4/2013 | Duncan | G01B 11/18 385/12 |
| 2013/0209044 A1 * | 8/2013 | Lowell | G02B 6/4416 385/101 |
| 2014/0105533 A1 * | 4/2014 | Jaaskelainen | G02B 6/4415 385/12 |
| 2015/0285626 A1 | 10/2015 | Yamauchi et al. | |

FOREIGN PATENT DOCUMENTS

| | | | | |
|---|---|---|---|---|
| CN | 110082875 A | * | 8/2019 | ............ G02B 6/441 |
| DE | 3015732 A1 | * | 10/1891 | ............ G02B 6/4415 |
| EA | 029335 B1 | * | 3/2018 | ............ G01L 1/243 |
| IT | 1184323 B | * | 10/1987 | ............ G02B 6/4434 |
| JP | 2006003197 A | * | 1/2006 | ............ G01B 11/00 |
| KR | 20170132213 A | * | 12/2017 | ............ B01J 31/22 |
| WO | WO-8600988 A1 | * | 2/1986 | ............ G01L 11/025 |
| WO | WO-9953353 A1 | * | 10/1999 | ............ G02B 6/443 |
| WO | WO-2007037366 A1 | * | 4/2007 | ............ G01B 11/16 |
| WO | WO-2014083989 A1 | * | 6/2014 | ............ G01L 1/242 |
| WO | WO-2017191685 A1 | * | 11/2017 | ............ G01B 11/16 |
| WO | WO-2018222535 A1 | * | 12/2018 | ............ G01H 9/004 |

OTHER PUBLICATIONS

CN_110082875_A (English translation) (Year: 2019).*
DE_3015732_A (English translation) (Year: 1981).*
EA_029335_B1 (English translation) (Year: 2018).*
IT_1184323_B (English translation) (Year: 1987).*
JP_2006003197_A (English translation) (Year: 2006).*
KR_20170132213_A (English translation) (Year: 2017).*
WO_2007037366_A1 (English translation) (Year: 2007).*
WO_2014083989_A1 (English translation) (Year: 2014).*
WO_2017191685_A1 (English translation) (Year: 2017).*
WO_9953353_A1 (English translation) (Year: 1999).*
D Awaji, et al., "Monitoring of Extremely Long Pre-Support Steel Pipe behavior using PPP-BOTDA Optical Fiber Sensing Method", Proceeding of 67th JSCE Symposium, Sep. 2012, VI-022, pp. 43-44.
K.Kishida, et al., "High resolution fibre-optic monitoring system for the FE Experiment in Mont Terri", Clay Conference 2015 (6th International conference), Brussel, Mar. 23-26, 2015, p. 16-07.
K.Nishiguchi, et al., "Error analysis for 3D shape sensing by fiber-optic distributed sensors", Proceedings of the 49th ISCIE International Symposium on Stochastic Systems Theory and Its Applications, Hiroshima, Nov. 3-4, 2017.
R.Sienko, et al.,"Suspension Bridge Deformation Measurements With Distributed Fiber Optic Sensors DFOS", Hybrid Bridges, Wroclaw(Poland), Nov. 29-30, 2018.
International Search Report (PCT/ISA/210) and Written Opinion (PCT/ISA/237) mailed on Nov. 17, 2020, by the Japan Patent Office as the International Searching Authority for International Application No. PCT/JP2020/038936. (8 pages).

* cited by examiner

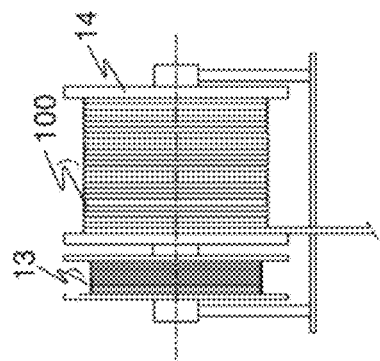
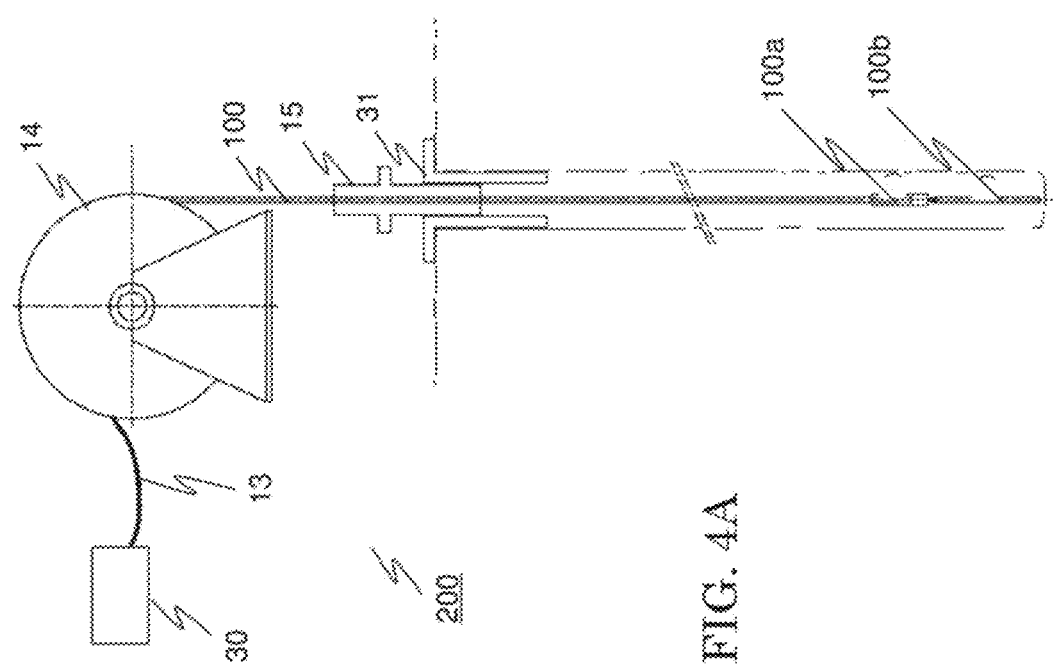
FIG. 4B
FIG. 4A

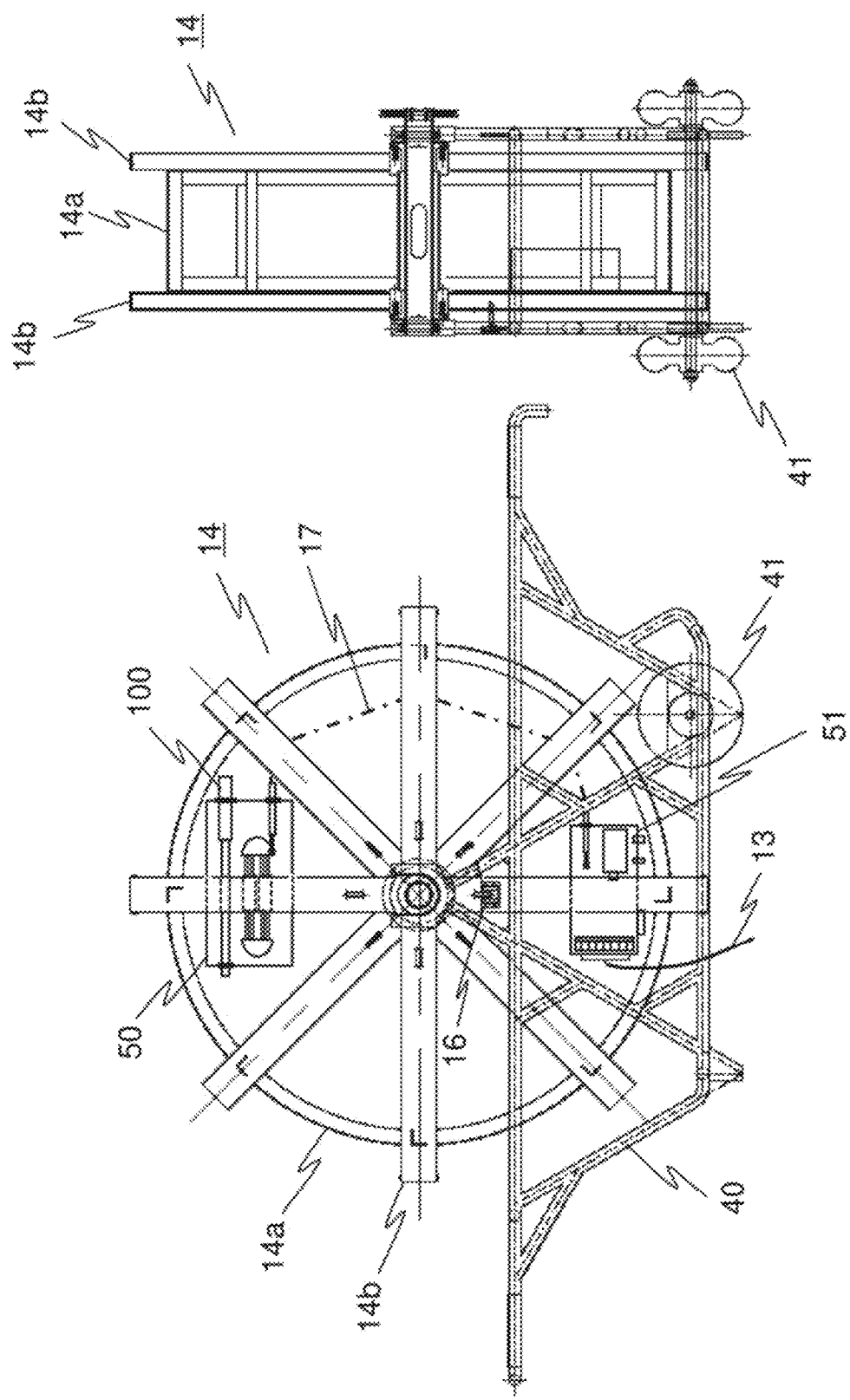

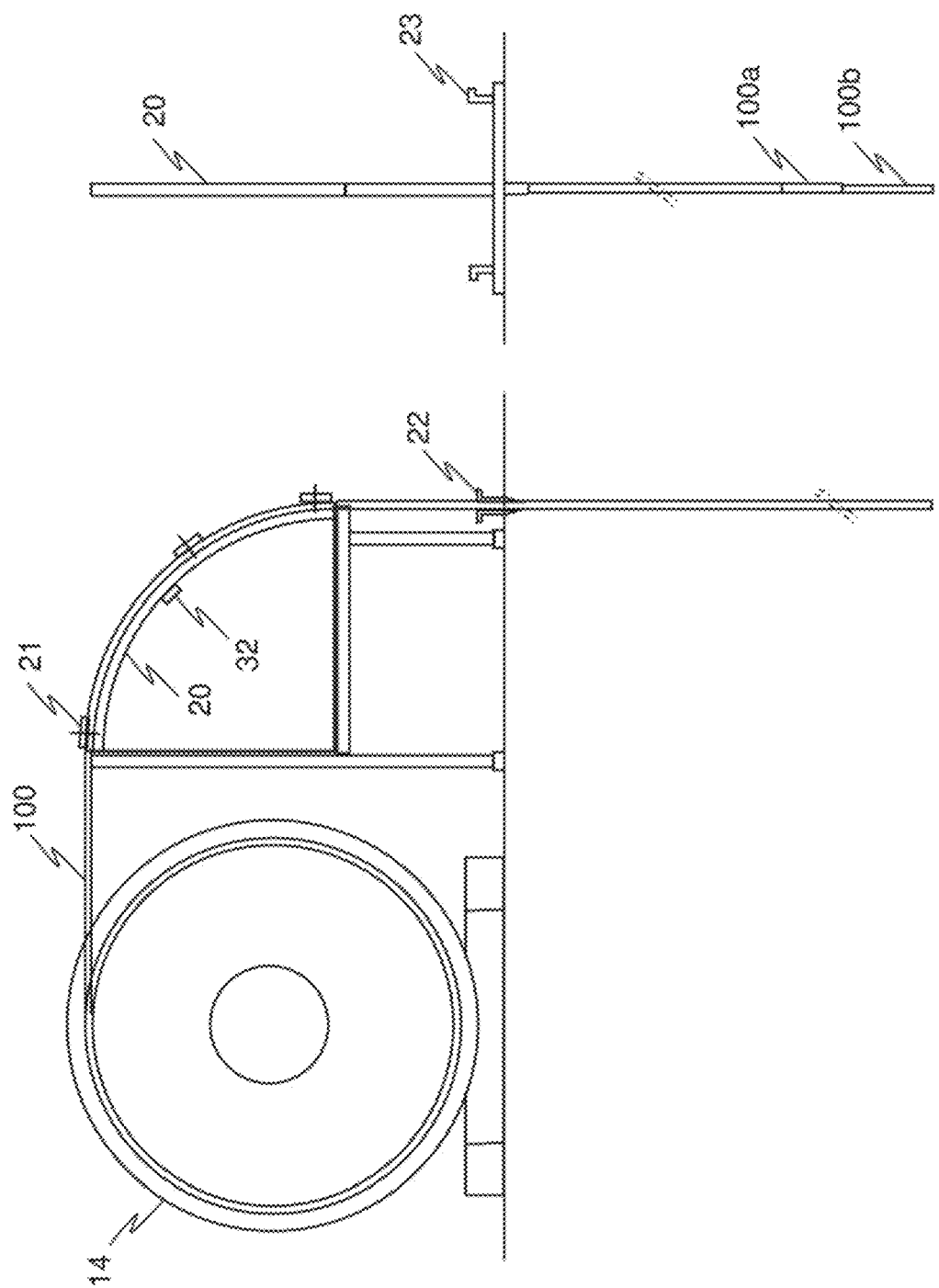

DISTRIBUTED POSITION DETECTION ROPE AND DISTRIBUTED POSITION DETECTION SYSTEM

TECHNICAL FIELD

The present disclosure relates to a distributed position detection rope and a distributed position detection system.

BACKGROUND ART

Distributed fiber optic sensing (DFOS) technology is being developed for practical use. This technology is being developed over a wide variety of aspects such as deformation, temperature, sound wave, and pressure, and actual records of on-site applications of this technology are being accumulated.

Meanwhile, technologies relevant to large-scale constructions such as bridges, tunnels, and roads which are social infrastructure were almost completed several tens of years ago. Equipment relevant to such social infrastructure is increasingly aging and how to maintain such aging equipment is a significant social problem.

For such equipment maintenance, monitoring technology using an optical fiber is highly expected in view of long distance and long life.

In particular, regarding deformation measurement using an optical fiber, a basic technology in civil engineering industry dealing with the above equipment is for measurement of one-dimensional strain on a line which can be directly measured. However, measurement needed on site is measurement of three-dimensional displacement, and thus there is a gap therebetween.

As monitoring technology using an optical fiber, the following technologies have been developed.

First, for investigating the behaviors of a natural ground and a pre-supporting steel pipe due to tunnel excavation, an optical fiber strain measurement method for an extremely long pre-supporting steel pipe based on pulse-prepump Brillouin optical time domain analysis (PPP-BOTDA) is developed (see, for example, Non-Patent Document 1). Using this method makes it possible to perform measurement with a distance resolution of up to 2 cm.

In addition, in an actual-scale verification experiment being conducted at a Mont-Terri underground laboratory in Switzerland, multiple 1:1 scale heating tests in Opalinus clay rock have been conducted for investigation and verification of a coupled thermo-hydro-mechanical (THM) process in host rock and an engineered barrier system (EBS). For this series of monitoring tests over a long term of several years, a distributed optical fiber monitoring system with a high resolution (spatial resolution of 2 cm) is used (see, for example, Non-Patent Document 2).

In addition, as an application example of a distributed optical fiber sensor, strain measurement has been performed for a steel girder of the Tadeusz Mazowiecki bridge over Wislok River, which is one of the largest suspension bridges in Poland. This bridge has the second highest guide tower in Poland and is fixed to the A-shaped guide tower having a height of 108 m by sixty-four iron cables with a cable total extension length of 482 m. This distributed optical fiber sensor is used for test strain measurement for a steel girder provided on the north side in a river width of 150 m and having a total measurement length of 600 m (see, for example, Non-Patent Document 3).

In addition, regarding shape measurement for a long-distance cable, a shape sensing method using strain data from optical fibers provided around a cable is proposed. In this method, an equation of a moving frame having a coefficient including a curvature and a twist rate obtained from strain measurement is solved to evaluate the shape. In this method, evaluation error is formulated by a stochastic differential equation (see, for example, Non-Patent Document 4).

In addition, the following method is proposed. A plurality of optical fibers helically embedded in a cylindrical attachment layer on the outer circumference of a shape body having a circular cross-section are deformed by bending, torsion, or extensional deformation occurring in the shape body due to an external pressure applied to the shape body. At this time, using frequency change or phase change of Brillouin scattering or Rayleigh scattering which is backscatter light of a pulse laser beam entering the optical fibers, a three-dimensional position after deformation of the shape body is measured. However, mass-production application thereof is not shown (see, for example, Patent Document 1).

In addition, regarding a position and sensing measurement instrument using two or more optical fibers having single cores or a multi-core optical fiber having two or more cores, it is proposed that, for all the optical fibers, the fiber cores are spatially separated from each other via as short a distance as possible in order to decrease mode coupling between the fiber cores. In this measurement instrument, the above optical fiber is physically associated with a target object, and strain in a part of the optical fiber associated with the target object is determined by optical frequency domain reflectometry (OFDR) using one or more Rayleigh scattering patterns for the part. Then, by the determined strain, the position or the shape of the target object is determined (see, for example, Patent Document 2).

Further, a precise measurement method and a precise measurement device for shape measurement using a multi-core fiber are proposed. In the method and device, an optical length is detected at any of the cores in the multi-core fiber, even for one point on the multi-core fiber. The location and/or the direction indication thereof is determined at a point on the multi-core fiber on the basis of detection change of the optical length. Accuracy of the determination is not greater than 0.5% of the multi-core fiber length (see, for example, Patent Document 3).

CITATION LIST

Non-Patent Document

Non-Patent Document 1: Awaji, et al., "Strain behavior of extremely long pre-supporting steel pipe based on PPP-BOTDA optical fiber measurement", 67th JSCE annual meeting (September 2012), VI-022, pp. 43-44

Non-Patent Document 2: K. Kishida, et al., "High resolution fibre-optic monitoring system for the FE Experiment in Mont Terri", Clay Conference 2015 ($6^{th}$ International conference), Brussel, Mar. 23-26, 2015, P-16-07

Non-Patent Document 3: R. Sienko, et al., "SUSPENSION BRIDGE DEFORMATION MEASUREMENTS WITH DISTRIBUTED FIBER OPTIC SENSORS DFOS", Hybrid Bridges, Wroclaw (Poland), 29-30 Nov. 2018

Non-Patent Document 4: K. Nishiguchi, et al., "Error analysis for 3D shape sensing by fiber-optic distributed sensors", Proceedings of the 49th ISCIE International Symposium on Stochastic Systems Theory and Its Applications, Hiroshima, Nov. 3-4, 2017

Patent Document

Patent Document 1: WO2014/083989
Patent Document 2: Specification of US Patent application publication No. 2008/0212082
Patent Document 3: Specification of US Patent application publication No. 2011/0109898

SUMMARY OF THE INVENTION

Problems to be Solved by the Invention

The optical fiber sensors used in Non-Patent Document 1 and Non-Patent Document 2 are not modularized and are manufactured on site. Therefore, there is a problem against a demand of making these optical fiber sensors spread over a wide variety of applications. In addition, these optical fiber sensors are not industrial products and therefore their reliability as a device has not been established yet.

Meanwhile, the optical fiber sensor shown in Non-Patent Document 3 has a problem that a mass-produced product thereof cannot perform torsion measurement. In addition, this sensor also has a problem that three-dimensional displacement of a measurement target object cannot be measured.

Further, the optical fiber sensors used in Patent Documents 2 and 3 have a problem that long-size application has not been realized, although measurement accuracy for a short distance has been confirmed.

The present disclosure has been made to solve the above problems, and an object of the present disclosure is to provide a distributed position detection rope that can perform measurement for a measurement target object even if the target object has a long size, can measure three-dimensional displacement of a measurement target object, enables modularization of an optical fiber sensor, and enables torsion measurement to be performed even by a mass-produced product thereof.

Solution to the Problems

A distributed position detection rope according to the present disclosure includes: basic optical elements each including an optical fiber for measuring a physical quantity, a plurality of tensile strength bodies located on both sides of the optical fiber so as to have intervals from the optical fiber, and a sheath material surrounding the optical fiber and the tensile strength bodies so as to integrate the optical fiber and the tensile strength bodies; a center axis body; a cylindrical inner sheath layer including a first optical element having the basic optical elements which are helically wound at a predetermined pitch along an axial direction of the center axis body and which, in a cross-section perpendicular to an axis of the center axis body, are arranged at predetermined intervals on a first circle, the inner sheath layer being provided on an outer side of the center axis body coaxially with the center axis body; and a cylindrical outer sheath layer including a second optical element having the basic optical elements which are helically wound along the axial direction of the center axis body so as to have a helical winding direction different from that of the first optical element and which, in the cross-section perpendicular to the axis of the center axis body, are arranged at predetermined intervals on a second circle different from the first circle and have a placement angle different from that of the basic optical elements of the first optical element, the outer sheath layer being provided on an outer side of the inner sheath layer coaxially with the center axis body.

Effect of the Invention

The distributed position detection rope according to the present disclosure makes it possible to provide a distributed position detection rope that can perform measurement for a measurement target object even if the target object has a long size, can measure three-dimensional displacement of a measurement target object, enables modularization of an optical fiber sensor, and enables torsion measurement to be performed even by a mass-produced product thereof.

BRIEF DESCRIPTION OF THE DRAWINGS

FIGS. 4A and 4B are conceptual diagrams illustrating an example of a distributed position detection system according to embodiment 3.

FIGS. 5A and 5B are conceptual diagrams illustrating the configuration of a skid drum in the distributed position detection system according to embodiment 3.

FIGS. 6A and 6B illustrate initial orientation measurement method in the distributed position detection system according to embodiment 3.

DESCRIPTION OF EMBODIMENTS

Embodiment 1

A distributed position detection rope of embodiment 1 will be described below, with reference to the drawings.

The distributed position detection rope of embodiment 1 has been developed for, as one of its purposes, applying a system using an optical fiber in monitoring a bridge, a tunnel, a road, or the like which is social infrastructure. Hereinafter, the structure of the distributed position detection rope will be described.

First, a basic optical element 5 which is a structure including an optical fiber 1 and is a main component having a sensing function of a distributed position detection rope 100 of embodiment 1 will be described with reference to FIG. 1.

Figure 1:
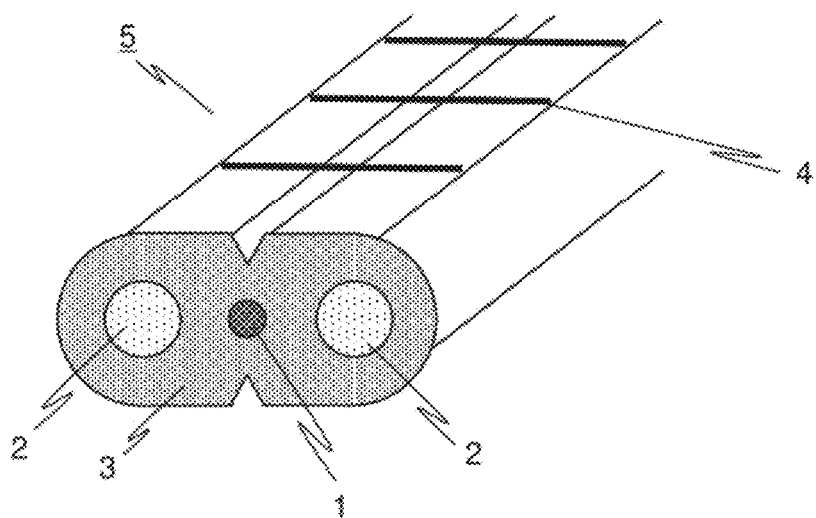
FIG. 1 illustrates an example of an optical element of a distributed position detection rope according to embodiment 1.

In FIG. 1, an oval-like face shown on the front side is a cross-section perpendicular to the longitudinal direction of the basic optical element 5. At upper and lower ends of a center part of the oval-like face, V-shaped cutouts (recesses) are formed in consideration of taking out of the optical fiber, thus having characteristics that the outer shape of the cross-section perpendicular to the longitudinal direction of the oval column is a spectacle frame shape.

At the center position as seen in the face having the spectacle frame shape, the optical fiber 1 in a single mode which has an increased bending strength is provided for measuring a physical quantity such as strain of a measurement target object. At both of the left and right sides of the optical fiber 1, tensile strength bodies 2 made of Kevlar fiber reinforced plastics (KFRP) are arranged substantially line-symmetrically with intervals from the optical fiber 2. By the tensile strength bodies 2, pre-tension is applied to the optical fiber 1 in advance. Thus, tension strain is generated in the optical element in advance, whereby it is possible to prevent wire breakage even when an excessive load is applied to the optical element. At a part other than the optical fiber 1 and the tensile strength bodies 2 in the basic optical element 5, a sheath material 3 for basic optical element, made of FRPE (abbreviation for flame retardant polyethylene (PE)) which is a flame-retardant material, is formed so as to surround them.

For suppressing positional displacement between the basic optical element 5 and a sheath of the distributed position detection rope 100 described in detail below, recess/projection shaped portions 4 are provided at substantially equal-pitch intervals on the sheath surface of the basic optical element 5 (these portions are shown at the upper-side outer surface in FIG. 1).

Next, the distributed position detection rope 100 will be described with reference to FIG. 2.

Figure 2:
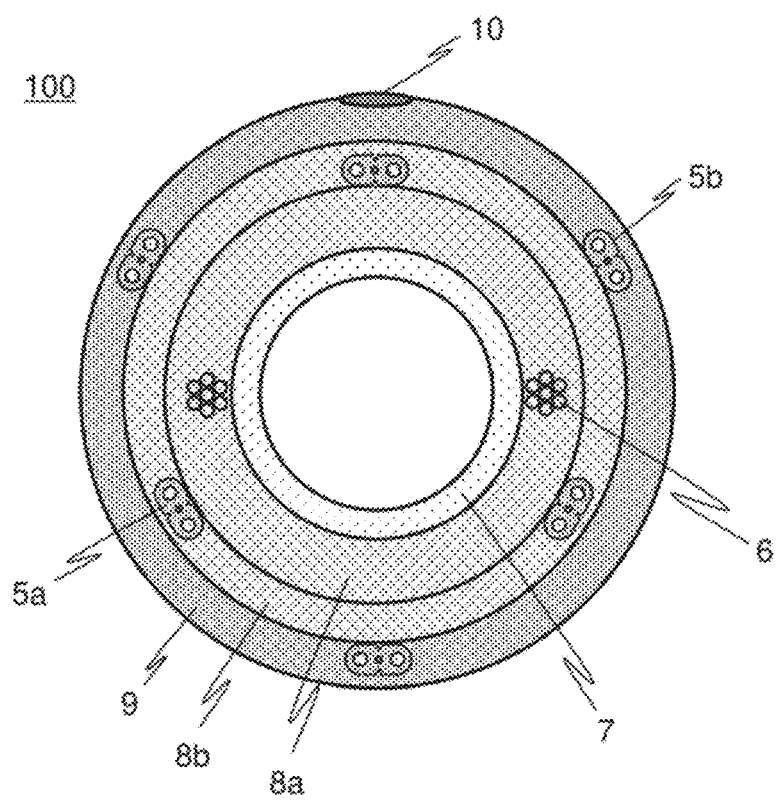
FIG. 2 is a sectional view illustrating an example of the distributed position detection rope according to embodiment 1.

FIG. 2 shows an example of the distributed position detection rope 100 of embodiment 1. At the axis center part of the distributed position detection rope 100, a hollow pipe 7 is provided. Inside a cylindrical inner sheath layer 8a which is located on the outer circumference of the pipe 7 and is a layer on the outer side of the pipe 7, tension members 6 formed by steel strands are provided straightly along the axial direction in order to protect the optical fiber from a tension applied at the time of installation, extension/contraction due to temperature change, or the like. As shown in FIG. 2, in a cross-section perpendicular to the axis of the distributed position detection rope 100, a pair of (two) tension members 6 are located at positions opposed to each other with respect to the center, in other words, at positions separated from each other by a central angle of 180 degrees, so as to be opposed to each other. The tension members 6 may not necessarily have a strand structure, and may have a non-strand structure.

Arranging the material of the tension member 6 (e.g., using KFRP) provides an effect that elastic deformation can be maintained even when slight extension is imparted. In addition, in a case where the Young's modulus of the tension member can be reduced, strain in the optical fiber 1 is more readily generated upon deformation of the distributed position detection rope 100, thus providing an effect of increasing sensitivity of the optical sensor.

Inside a cylindrical inner sheath layer 8b which is located on the outer circumference of the inner sheath layer 8a and is a layer on the outer side of the inner sheath layer 8a, three basic optical elements 5 having exactly the same structure as the above-described basic optical element 5 are provided while being helically wound along the axial direction (these three basic optical elements are collectively referred to as first optical element 5a), and as shown in FIG. 2, in the cross-section perpendicular to the axis of the distributed position detection rope 100, the three basic optical elements 5 are arranged at predetermined intervals on the same circle.

Inside a cylindrical outer sheath layer 9 which is located on the outer circumference of the inner sheath layer 8b and is a layer on the outer side of the inner sheath layer 8b, three basic optical elements 5 having exactly the same structure as the above-described basic optical element 5 are provided while being helically wound along the axial direction (these three basic optical elements are collectively referred to as second optical element 5b), and as shown in FIG. 2, in the cross-section perpendicular to the axis of the distributed position detection rope 100, the three basic optical elements 5 are arranged at predetermined intervals on the same circle. The materials of the inner sheath layers 8a, 8b and the outer sheath layer 9 are PVC or the like, and the color of the materials is black, for example.

In order to enable detection of strain due to torsion of a measurement target body, the helical winding direction of the second optical element 5b is set to be opposite to the helical winding direction of the first optical element 5a. Here, the winding pitches of the first optical element and the second optical element are the same. These optical elements are supported by a support body (sheath) (not shown) so that their set positions will not change. With such a configuration, strain due to torsion of a measurement target body can be accurately measured, and therefore detection accuracy for strain due to bending is also improved. In principle, if the helical winding directions are different between the first optical element and the second optical element, it is possible to detect strain due to torsion except for a case where the value of the ratio of a winding pitch P and a placement radius r in the cross-section perpendicular to the axis, i.e., P/r, is the same therebetween (data of actual detected torsion will be described later in detail). Here, for the ratio P/r, a relationship of $\tan \theta = P/(2\pi r)$ is satisfied, where $\theta$ is a placement angle (see Patent Document 1). Therefore, it can be said that, if the placement angles are not the same, i.e., if the placement angles are different, it is possible to detect strain due to torsion of a measurement target body as long as the helical winding directions are different.

The material of the element sheath material 3 of the basic optical element 5 and the material of each of the inner sheath layers 8a, 8b and the outer sheath layer 9 of the distributed position detection rope 100 are made different from each other, thus making it easy to take out the basic optical element 5. At a part of the outer circumferential surface of the cable along the longitudinal direction (axial direction) of the distributed position detection rope 100, a color band 10 colored in a different color (e.g., yellow) from the color of the outer sheath layer is provided. Thus, in a case where the distributed position detection rope is installed on site, the placement direction (placement state) of the distributed position detection rope 100 can be easily confirmed.

Since the basic optical element is configured as described above, the optical fiber as a sensor can be modularized in a form of the basic optical element, thus enabling mass production of the distributed position detection rope.

Embodiment 2

Figure 3:
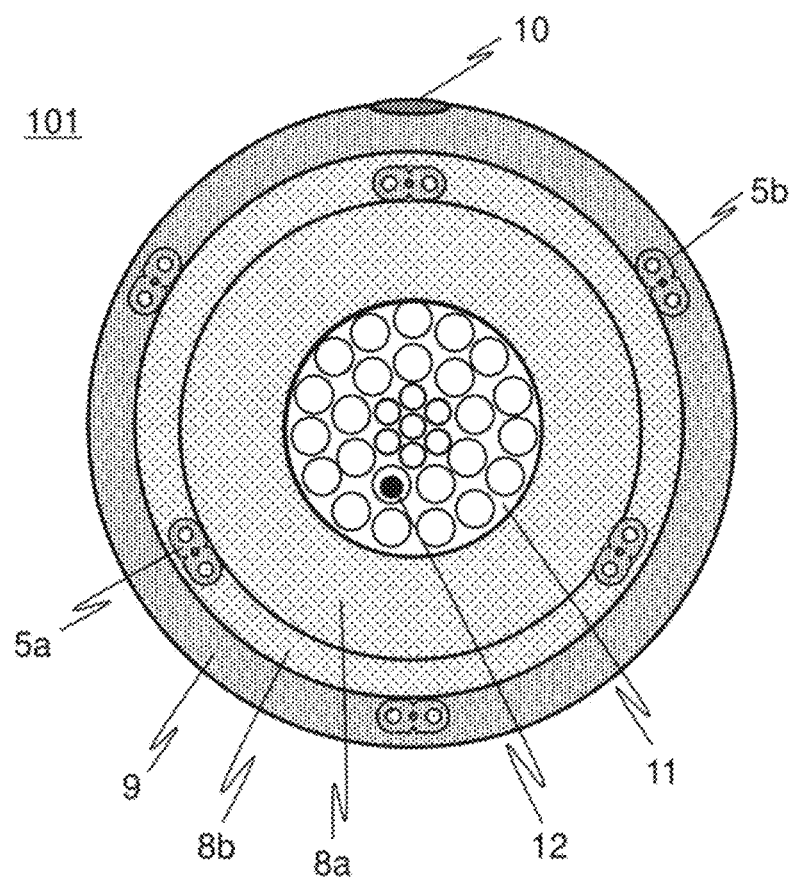
FIG. 3 is a sectional view illustrating an example of a distributed position detection rope according to embodiment 2.

A distributed position detection rope 101 of embodiment 2 will be described below, with reference to FIG. 3. As shown in FIG. 3, in the distributed position detection rope 101 of embodiment 2, the axis center part is formed to have a solid structure and the outer diameter is made smaller, as compared to the distributed position detection rope 100 of embodiment 1. This provides an effect that fiber breakage when the cable is bent is less likely to occur. Since the axis center part is formed to have a solid structure using multilayer steel wires, the tension members described in embodiment 1 are not used in embodiment 2. The basic optical element 5 which is a main component is substantially the same as that in embodiment 1 except for the material of the tensile strength bodies (steel wires are used) and the outer diameter size (reduced diameter), and therefore the detailed description thereof is omitted here.

Next, the detailed structure of the distributed position detection rope 101 of embodiment 2 will be described with reference to FIG. 3. In FIG. 3, a center axis core 11 is composed of multilayer steel wires including a T fiber 12 for temperature measurement. In order to measure strain occurring due to torsion of the cable in addition to strain occurring due to bending of the cable, as in embodiment 1, the first optical element 5a is arranged in the inner sheath layer 8b helically along the axial direction of the distributed position detection rope 101, the second optical element 5b is arranged in the outer sheath layer 9 helically along the axial direction of the distributed position detection rope 101, and the first optical element 5a and the second optical element 5b are wound in directions opposite to each other. Such matters and the like are the same as in embodiment 1.

As described above, in both of the distributed position detection ropes of embodiment 1 and embodiment 2, the optical fiber for measurement is placed inside the basic optical element 5 as a main component of the basic optical element 5, together with the two tensile strength bodies provided on both sides of the optical fiber. Thus, mass production can be easily performed.

Embodiment 3

Next, a distributed position detection system 200 in a case where the distributed position detection rope 100 of embodiment 1 or the distributed position detection rope 101 of embodiment 2 is used on an actual site will be described with reference to FIGS. 4A, 4B, and FIGS. 5A and 5B, etc.

FIGS. 4A and 4B are model diagrams illustrating the distributed position detection system 200 in a case where the distributed position detection rope 100 of embodiment 1 is used on site as an example. As shown in FIG. 4A, measurement data based on backscatter light due to strain or the like occurring in a measurement target object measured by the distributed position detection rope 100 is transferred to an eight-core connection cable 13 for transferring eight kinds of signals, via two optical junction boxes (not shown) described later which are provided to a drum skid 14 for winding the distributed position detection rope 100. Then, the measurement data is sent to a measurement instrument 30 to which the connection cable 13 is connected and which is for measuring strain in the measurement target body, and calculation processing is performed by the measurement instrument 30, whereby strain in the measurement target body is calculated. It is noted that the aforementioned eight cores include cores for the basic optical elements described in embodiment 1, for the T fiber described in embodiment 2, and for a gyro sensor described later.

In addition, in order to collect data from the measurement target body, the distributed position detection rope 100 is moved down inside a well in conjunction with rotation of the drum skid 14 by a handle 15 provided near an entrance part of the well, and thus is placed at a predetermined position. In this case, at the entrance part of the well, a tiltmeter 31 is provided for accurately placing the distributed position detection rope 100 with respect to the ground. The distributed position detection rope 100 is sequentially moved down into the well, from a rope end 100a which is a distal end of the distributed position detection rope, using a weight 100b connected to the rope end 100a, and thus is placed at a predetermined position.

FIG. 4B is a view of the drum skid 14 as seen from a side face. As shown in FIG. 4B, the distributed position detection rope 100 and the connection cable 13 are wound in the axial direction around a rotary shaft part of the drum skid 14.

FIGS. 5A and 5B illustrate the detailed structure of the drum skid 14. In FIG. 5A, the drum skid 14 is composed of a cylindrical body 14a for winding the distributed position detection rope 100, a plurality of plate-shaped support bodies 14b which are for rotating the cylindrical body around the shaft and cross each other at the shaft part, a stopper 16 for stopping the drum skid so as not to rotate, a drum skid support body 40 supporting the drum skid at the shaft part, wheels 41 used for moving the drum skid 14, and the like. The drum skid 14 is provided with two optical junction boxes (two termination boxes 50 and 51) for relaying a signal measured by the distributed position detection rope 100 to the connection cable 13 for signal transfer, a jumper wire 17 connecting the two optical junction boxes, and the like. FIG. 5B is a side view of the drum skid 14 described above. As shown in FIG. 5B, a pair of plate-shaped support bodies 14b are provided at the left and right of the cylindrical body 14a. In FIG. 5B, components such as the optical junction boxes other than the drum skid 14 are not shown.

Next, an initial configuration needed for installing the distributed position detection rope 100 wound around the drum skid 14 on site and measuring desired (predetermined, i.e., prescribed) data will be described with reference to FIGS. 6A and 6B.

As shown in FIG. 6A, the distal end of the distributed position detection rope 100 led out from the upper part of the drum skid 14 passes along the outer periphery of the arc stand 20 having an arc-shaped structure corresponding to a quarter circle, and passes through a distributed position detection rope fixation wedge 22 provided at the entrance part of a well which is a measurement target, so as to be moved to a predetermined position in the well. After the movement, the position of the distributed position detection rope 100 is fixed by a plurality of rope holders 21 provided on the arc-shaped part and the distributed position detection rope fixation wedge, so that the position after the movement is not changed. Here, on the inner side of the arc-shaped part, a gyro sensor 32 for performing more accurate position detection at the time of position measurement is provided.

As shown in FIG. 6B, for finely adjusting the angular position with respect to the ground surface where the well is present, the placement position (direction with respect to the ground surface) of the distributed position detection rope 100 at the entrance part of the well is finely adjusted by a distributed position detection rope orientation adjuster 23 for position adjustment which is provided at the entrance part of the well. As shown also in FIG. 6B, the weight 100b is connected to the rope end 100a of the distributed position detection rope 100 in order to smoothly move the distributed position detection rope 100 so as to be quickly placed at a desired (predetermined, i.e., prescribed) measurement position.

By setting the initial configuration of the distributed position detection rope 100 as shown in FIGS. 6A and 6B, it becomes possible to more accurately specify measurement positions corresponding to measured physical data such as strain and temperature of the measurement target body measured by the optical elements.

Figure 7A:
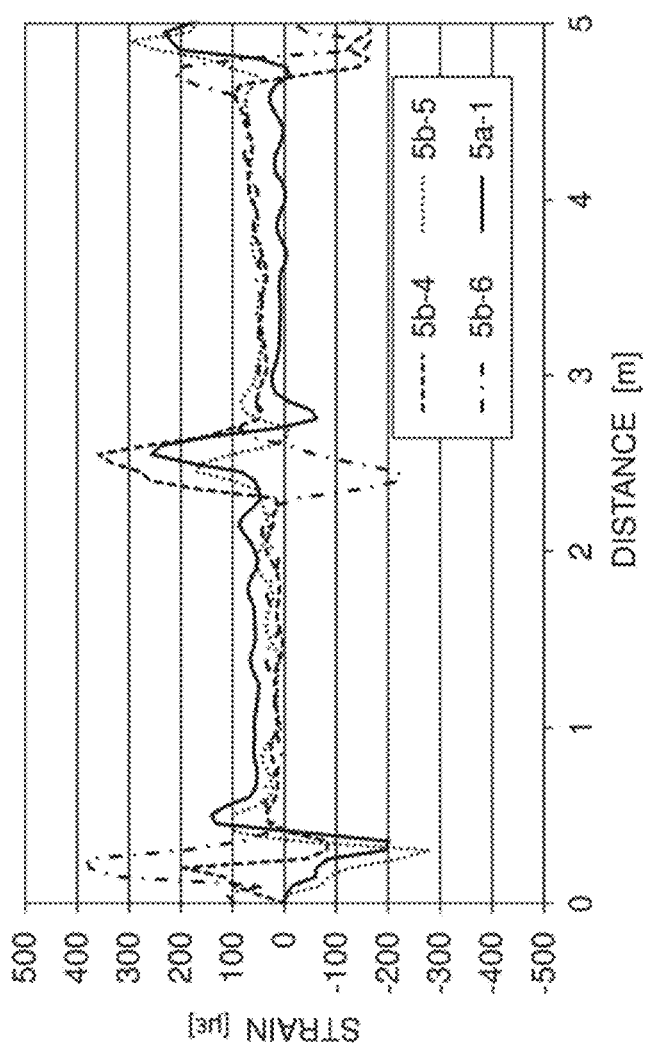
FIG. 7A illustrates an example of strain data of a measurement target body measured by the distributed position detection system according to embodiment 3.

In use of the distributed position detection system 200 as described above, for evaluating the amount of strain occurring due to an applied external force, displacement was given to a center part of the distributed position detection rope for evaluation which was fixed and supported at both ends (position at 0.4 m and position at 4.6 m in FIG. 7A) and whose entire length was 5 m. FIG. 7A shows a measurement result of the amount of strain occurring in the distributed position detection rope at this time.

Figure 7B:
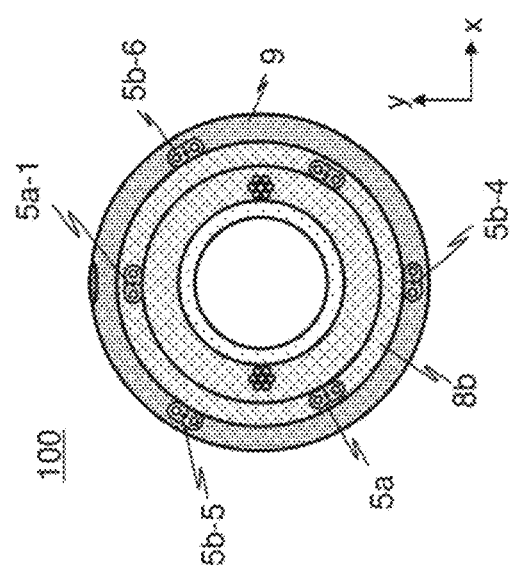
FIG. 7B illustrates basic optical elements which measured the measurement data shown in FIG. 7A.

In FIG. 7A, the horizontal axis indicates the distance of the distributed position detection rope from a reference position (unit: m), and the longitudinal axis indicates the amount of strain occurring in the distributed position detection rope (unit: με). Four curves shown in FIG. 7A represent measurement data corresponding to basic optical elements 5a-1, 5b-4, 5b-5, 5b-6 in FIG. 7B, respectively.

That is, the curve shown by a solid line in FIG. 7A corresponds to measurement data of the basic optical element 5a-1 (located in the inner sheath layer 8b), the curve shown by a broken line in FIG. 7A corresponds to measurement data of the basic optical element 5b-4 (located in the outer sheath layer 9), the curve shown by a dotted line in FIG. 7A corresponds to measurement data of the basic optical element 5b-5 (located in the outer sheath layer 9), and the curve shown by a dotted-dashed line in FIG. 7A corresponds to measurement data of the basic optical element 5b-6 (located in the outer sheath layer 9).

In FIG. 7A, it is found that three data of the basic optical elements 5b-4, 5b-5, 5b-6 in the outer sheath layer in the first half section from a distance 0.4 m to a distance 2 m and in the second half section from a distance 3 m to a distance 4.6 m exhibit approximately the same strain value distributions, and meanwhile, in the above two sections, values of strain in the basic optical element 5a-1 located in the inner sheath layer 8b and values of strain in the basic optical elements 5b-4, 5b-5, 5b-6 located in the outer sheath layer have relationships opposite to each other. That is, it is indicated that "torsion" has occurred between the first half section and the second half section of the distributed position detection rope for evaluation.

This indicates that "torsion" occurring in the distributed position detection rope for evaluation can be detected by three basic optical elements in the outer sheath layer and at least one basic optical element in the inner sheath layer of which the placement sheath layers and the helical winding angles are different from each other. Further, a combination of three basic optical elements in the inner sheath layer and at least one basic optical element in the outer sheath layer, corresponding to a case opposite to the above, may be employed.

Accordingly, on the basis of the four data in FIG. 7A, "torsion" occurring in the distributed position detection rope for evaluation is calculated using the measurement instrument 30 in the distributed position detection system. The calculation result is shown in FIG. 8.

Figure 8:
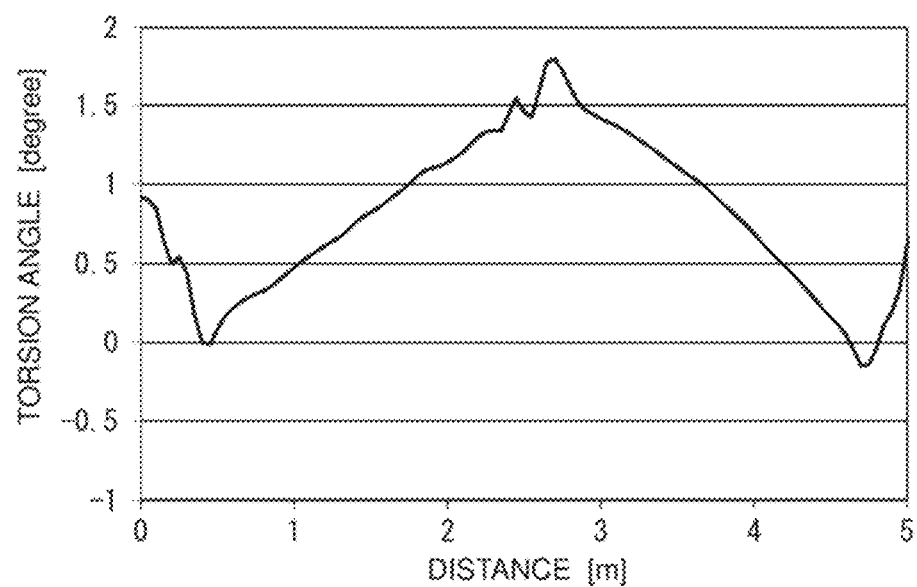
FIG. 8 shows an example of torsion data of a measurement target body measured by the distributed position detection system according to embodiment 3.

FIG. 8 shows the relationship between a "position on the rope (represented by distance)" and a "torsion angle" of torsion occurring in the distributed position detection rope for evaluation, calculated using the measurement instrument 30 in the distributed position detection system.

In FIG. 8, it is found that the torsion angle of the distributed position detection rope changes approximately in a mountain shape between the fixed support points at both ends of the distributed position detection rope for evaluation (points at distance 0.4 m and distance 4.6 m; the value of the torsion angle is zero at these points as shown in FIG. 8).

That is, it is found that it becomes possible to measure "torsion" occurring in the distributed position detection rope by using a combination of three basic optical elements and one basic optical element of which the placement sheath layers and the helical winding angles are different from each other.

As described above, it is found that, by using this distributed position detection rope and, for example, fixing this to the measurement target body, it is possible to measure "torsion" occurring in the measurement target body through measurement for strain occurring in the measurement target body.

In the above description, the example in which "torsion" is measured using one basic optical element in the inner sheath layer has been shown. However, without limitation thereto, it is possible to perform more accurate measurement for "torsion" by using two basic optical elements (at least one of them) that have not been used among the basic optical elements in the inner sheath layer.

In addition, from three strain data of the basic optical elements 5b-4, 5b-5, 5b-6 located in the outer sheath layer, it is possible to evaluate the amount of bending occurring in a specific cross-section of the distributed position detection rope (plane defined by an x direction and a y direction when coordinates in the cross-section are represented by x and y), i.e., each of cross-sections along the longitudinal direction of the distributed position detection rope.

Thus, it is found that this distributed position detection system enables measurement of three-dimensional deformation of the measurement target body.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment. Specifically, the color band 10 shown in embodiments 1 and 2 is such an example, and in each embodiment, an object of the present disclosure can be achieved without the color band.

DESCRIPTION OF THE REFERENCE CHARACTERS

1 optical fiber
2 tensile strength body
3 sheath material
4 recess/projection shaped portion
5, 5a-1, 5b-4, 5b-5, 5b-6 basic optical element
5a first optical element
5b second optical element
6 tension member
7 pipe
8a, 8b inner sheath layer
9 outer sheath layer
10 color band
11 center axis core 12 T fiber
13 connection cable
14 drum skid
14a cylindrical body
14b plate-shaped support body
15 handle
16 stopper
17 jumper wire
20 arc stand
21 rope holder
22 distributed position detection rope fixation wedge
23 distributed position detection rope orientation adjuster
30 measurement instrument
31 tiltmeter
32 gyro sensor
40 drum skid support body
41 wheel
50, 51 termination box
100, 101 distributed position detection rope
100a rope end
100b weight
200 distributed position detection system

The invention claimed is:

1. A distributed position detection rope comprising:
basic optical elements each including an optical fiber for measuring a physical quantity, a plurality of tensile strength bodies located on opposite sides of the optical fiber so as to have intervals from the optical fiber, and a sheath material surrounding the optical fiber and the tensile strength bodies so as to integrate the optical fiber and the tensile strength bodies, the sheath material having an outer surface with recess/projection shaped portions provided at constant intervals along an axial direction of the sheath material;
a center axis body;
a cylindrical inner sheath layer including a first optical element having the basic optical elements which are wound at a predetermined pitch along an axial direction of the center axis body and which, in a cross-section perpendicular to an axis of the center axis body, are arranged at predetermined intervals on a first circle, the inner sheath layer being provided on an outer side of the center axis body coaxially with the center axis body; and
a cylindrical outer sheath layer including a second optical element having the basic optical elements which are wound along the axial direction of the center axis body and which, in the cross-section perpendicular to the axis of the center axis body, are arranged at predetermined intervals on a second circle different from the first circle and have a placement angle different from that of the basic optical elements of the first optical element, the outer sheath layer being provided on an outer side of the inner sheath layer coaxially with the center axis body.

2. The distributed position detection rope according to claim 1, wherein
the center axis body is a pipe,
the distributed position detection rope further comprising a cylindrical second inner sheath layer including a plurality of tension members which, in the cross-section perpendicular to the axis of the center axis body, are located at positions on the same circle that are opposed to each other with respect to an axis center, the second inner sheath layer being located on an outer circumference of the center axis body and on an inner circumference of the inner sheath layer, the second inner sheath layer being provided coaxially with the center axis body.

3. The distributed position detection rope according to claim 2, wherein
the sheath material is formed of a material different from those of the inner sheath layer and the outer sheath layer, and has recess/projection shaped portions provided at constant intervals on an axial-direction surface thereof.

4. A distributed position detection system comprising:
the distributed position detection rope according to claim 2;
a drum skid which rotates around a shaft thereof and has an outer circumferential part around which the distributed position detection rope is wound;
a weight connected to one end of the distributed position detection rope;
a handle for moving the distributed position detection rope in synchronization with rotation of the drum skid;
a tiltmeter for adjusting a placement position of the distributed position detection rope placed on a measurement target body, in order to place the distributed position detection rope at a desired measurement position;
a measurement instrument for measuring a physical quantity of the measurement target body through calculation on signals measured by the optical fibers of the optical elements; and
a connection cable which is connected to another end of the distributed position detection rope and transfers signals to the measurement instrument, wherein
the distributed position detection rope wound around the drum skid is moved to a desired position by the handle and the weight while the drum skid is rotated, and thus is placed at a desired angle by the tiltmeter, and
the physical quantity of the measurement target body is measured at the desired position, using the measurement instrument.

5. The distributed position detection system according to claim 4, further comprising an arc stand having an arc-shaped structure portion provided with a gyro sensor, a distributed position detection rope fixation wedge, and a distributed position detection rope orientation adjuster, the arc stand being provided on an outer side of the drum skid so as to be axially parallel with the shaft of the drum skid, wherein
while an orientation of the distributed position detection rope is adjusted by the gyro sensor and the distributed position detection rope orientation adjuster, the distributed position detection rope is moved along the arc-shaped structure portion of the arc stand, and the distributed position detection rope is fixed at a desired position by the distributed position detection rope fixation wedge, to perform measurement for the physical quantity of the measurement target body.

6. The distributed position detection system according to claim 4, wherein
from signals detected by three of the basic optical elements provided in the outer sheath layer and at least one of the basic optical elements provided in the inner sheath layer, torsion of the measurement target body is calculated on the basis of measured strain in the measurement target body, by the measurement instrument.

7. The distributed position detection rope according to claim 1, wherein the center axis body is a center axis core that is a solid body formed so as to include a plurality of steel wires, the distributed position detection rope further comprising a cylindrical third inner sheath layer which, in the cross-section perpendicular to the axis of the center axis body, is located on an outer circumference of the center axis body and on an inner circumference of the inner sheath layer, the third inner sheath layer being provided coaxially with the center axis body.

8. The distributed position detection rope according to claim 7, wherein the sheath material is formed of a material different from those of the inner sheath layer and the outer sheath layer, and has recess/projection shaped portions provided at constant intervals on an axial-direction surface thereof.

9. A distributed position detection system comprising:

the distributed position detection rope according to claim 7;

a drum skid which rotates around a shaft thereof and has an outer circumferential part around which the distributed position detection rope is wound;

a weight connected to one end of the distributed position detection rope;

a handle for moving the distributed position detection rope in synchronization with rotation of the drum skid;

a tiltmeter for adjusting a placement position of the distributed position detection rope placed on a measurement target body, in order to place the distributed position detection rope at a desired measurement position;

a measurement instrument for measuring a physical quantity of the measurement target body through calculation on signals measured by the optical fibers of the optical elements; and a connection cable which is connected to another end of the distributed position detection rope and transfers signals to the measurement instrument, wherein the distributed position detection rope wound around the drum skid is moved to a desired position by the handle and the weight while the drum skid is rotated, and thus is placed at a desired angle by the tiltmeter, and the physical quantity of the measurement target body is measured at the desired position, using the measurement instrument.

10. The distributed position detection system according to claim 9, further comprising an arc stand having an arc-shaped structure portion provided with a gyro sensor, a distributed position detection rope fixation wedge, and a distributed position detection rope orientation adjuster, the arc stand being provided on an outer side of the drum skid so as to be axially parallel with the shaft of the drum skid, wherein while an orientation of the distributed position detection rope is adjusted by the gyro sensor and the distributed position detection rope orientation adjuster, the distributed position detection rope is moved along the arc-shaped structure portion of the arc stand, and the distributed position detection rope is fixed at a desired position by the distributed position detection rope fixation wedge, to perform measurement for the physical quantity of the measurement target body.

11. The distributed position detection system according to claim 9, wherein from signals detected by three of the basic optical elements provided in the outer sheath layer and at least one of the basic optical elements provided in the inner sheath layer, torsion of the measurement target body is calculated on the basis of measured strain in the measurement target body, by the measurement instrument.

12. The distributed position detection rope according to claim 1, wherein the sheath material is formed of a material different from those of the inner sheath layer and the outer sheath layer.

13. A distributed position detection system comprising:

the distributed position detection rope according to claim 12;

a drum skid which rotates around a shaft thereof and has an outer circumferential part around which the distributed position detection rope is wound;

a weight connected to one end of the distributed position detection rope;

a handle for moving the distributed position detection rope in synchronization with rotation of the drum skid;

a tiltmeter for adjusting a placement position of the distributed position detection rope placed on a measurement target body, in order to place the distributed position detection rope at a desired measurement position;

a measurement instrument for measuring a physical quantity of the measurement target body through calculation on signals measured by the optical fibers of the optical elements; and a connection cable which is connected to another end of the distributed position detection rope and transfers signals to the measurement instrument, wherein the distributed position detection rope wound around the drum skid is moved to a desired position by the handle and the weight while the drum skid is rotated, and thus is placed at a desired angle by the tiltmeter, and the physical quantity of the measurement target body is measured at the desired position, using the measurement instrument.

14. The distributed position detection system according to claim 13, further comprising an arc stand having an arc-shaped structure portion provided with a gyro sensor, a distributed position detection rope fixation wedge, and a distributed position detection rope orientation adjuster, the arc stand being provided on an outer side of the drum skid so as to be axially parallel with the shaft of the drum skid, wherein while an orientation of the distributed position detection rope is adjusted by the gyro sensor and the distributed position detection rope orientation adjuster, the distributed position detection rope is moved along the arc-shaped structure portion of the arc stand, and the distributed position detection rope is fixed at a desired position by the distributed position detection rope fixation wedge, to perform measurement for the physical quantity of the measurement target body.

15. The distributed position detection system according to claim 13, wherein from signals detected by three of the basic optical elements provided in the outer sheath layer and at least one of the basic optical elements provided in the inner sheath layer, torsion of the measurement target body is calculated on the basis of measured strain in the measurement target body, by the measurement instrument.

16. A distributed position detection system comprising:

the distributed position detection rope according to claim 1;

a drum skid which rotates around a shaft thereof and has an outer circumferential part around which the distributed position detection rope is wound;

a weight connected to one end of the distributed position detection rope;

a handle for moving the distributed position detection rope in synchronization with rotation of the drum skid;

a tiltmeter for adjusting a placement position of the distributed position detection rope placed on a measurement target body, in order to place the distributed position detection rope at a desired measurement position;

a measurement instrument for measuring a physical quantity of the measurement target body through calculation on signals measured by the optical fibers of the optical elements; and a connection cable which is connected to another end of the distributed position detection rope and transfers signals to the measurement instrument, wherein the distributed position detection rope wound around the drum skid is moved to a desired position by the handle and the weight while the drum skid is rotated, and thus is placed at a desired angle by the tiltmeter, and the physical quantity of the measurement target body is measured at the desired position, using the measurement instrument.

17. The distributed position detection system according to claim 16, further comprising an arc stand having an arc-shaped structure portion provided with a gyro sensor, a distributed position detection rope fixation wedge, and a distributed position detection rope orientation adjuster, the arc stand being provided on an outer side of the drum skid so as to be axially parallel with the shaft of the drum skid, wherein while an orientation of the distributed position detection rope is adjusted by the gyro sensor and the distributed position detection rope orientation adjuster, the distributed position detection rope is moved along the arc-shaped structure portion of the arc stand, and the distributed position detection rope is fixed at a desired position by the distributed position detection rope fixation wedge, to perform measurement for the physical quantity of the measurement target body.

18. The distributed position detection system according to claim 17, wherein from signals detected by three of the basic optical elements provided in the outer sheath layer and at least one of the basic optical elements provided in the inner sheath layer, torsion of the measurement target body is calculated on the basis of measured strain in the measurement target body, by the measurement instrument.

19. The distributed position detection system according to claim 16, wherein from signals detected by three of the basic optical elements provided in the outer sheath layer and at least one of the basic optical elements provided in the inner sheath layer, torsion of the measurement target body is calculated on the basis of measured strain in the measurement target body, by the measurement instrument.

* * * * *